(12) United States Patent
Jonsson et al.

(10) Patent No.: US 9,672,409 B2
(45) Date of Patent: Jun. 6, 2017

(54) APPARATUS AND COMPUTER-IMPLEMENTED METHOD FOR FINGERPRINT BASED AUTHENTICATION

(71) Applicant: Fingerprint Cards AB, Göteborg (SE)

(72) Inventors: Kenneth Jonsson, Kungälv (SE); Eric Setterberg, Västra Frölunda (SE); David Tingdahl, Mölndal (SE)

(73) Assignee: FINGERPRINT CARDS AB, Göteborg (SE)

( * ) Notice: Subject to any disclaimer, the term of this patent is extended or adjusted under 35 U.S.C. 154(b) by 0 days.

(21) Appl. No.: 15/189,055

(22) Filed: Jun. 22, 2016

(65) Prior Publication Data
US 2017/0004352 A1    Jan. 5, 2017

(30) Foreign Application Priority Data

Jul. 3, 2015 (SE) ...................................... 1550972

(51) Int. Cl.
G06K 9/00 (2006.01)
(52) U.S. Cl.
CPC .......... *G06K 9/00114* (2013.01); *G06K 9/001* (2013.01); *G06K 9/0008* (2013.01); *G06K 9/00013* (2013.01)
(58) Field of Classification Search
CPC  G06F 17/30784; G06K 9/00711; G06K 9/46; G06K 9/00013; G06K 9/00087;
(Continued)

(56) References Cited

U.S. PATENT DOCUMENTS

2007/0014443 A1\*  1/2007  Russo ................ G06K 9/00906
                                                            382/124
2007/0081698 A1\*  4/2007  Hamid ............... G06K 9/00046
                                                            382/124
(Continued)

FOREIGN PATENT DOCUMENTS

EP   2101282 B1   9/2012
GB   2356961 A    6/2001

OTHER PUBLICATIONS

Bozhao Tan; Schuckers S, "Liveness Detection for Fingerprint Scanners Based on the Statistics of Wavelet Signal Processing", Computer Vision and Pattern Recognition Workshop, 2006 Conference on New York, NY, USA Jun. 17-22, 2006, Jun. 17, 2006; Jun. 17, 2006-Jun. 22, 2006, Piscataway, NJ, USA, IEEE, Piscataway, NJ, USA, ISBN 978-0-7695-2646-1 ISBN 0-7695-2646-2.

(Continued)

*Primary Examiner* — Bhavesh Mehta
*Assistant Examiner* — Narek Zohrabyan
(74) *Attorney, Agent, or Firm* — Remarck Law Group PLC

(57) ABSTRACT

A computer-implemented method of performing fingerprint based authentication from matching local features represented by binary features which can be matched in an efficient implementation in one or both of software and hardware by computing Hamming distances between the binary features. A local feature in a verification image is said to be matching with a local feature in an enrolment image if the Hamming distance between the binary features falls below a pre-determined threshold. The computer-implemented method retains information about the similarity of local features in the two images and utilities it in an efficient way with the objective of improving fingerprint recognition rates and enabling finger liveness detection. In an aspect a (Continued)

normalized feature similarity distribution is generated as part of the representation in recognition and liveness detection.

13 Claims, 5 Drawing Sheets

(58) Field of Classification Search
CPC ........... G06K 9/00107; G06K 9/00114; G06K 9/0012; G06K 9/6267; G06K 9/627; A61B 5/1172; G06N 5/00; G06N 99/005; G06T 2207/20081; H04N 1/4074
USPC .................. 382/124, 155, 224, 227, 168, 115
See application file for complete search history.

(56) References Cited

U.S. PATENT DOCUMENTS

| | | | |
|---|---|---|---|
| 2008/0253625 | A1 | 10/2008 | Schuckers et al. |
| 2009/0226052 | A1* | 9/2009 | Fedele ............... G06K 9/00046 382/125 |
| 2009/0316963 | A1 | 12/2009 | Boshra |
| 2014/0294262 | A1* | 10/2014 | Schuckers .......... G06K 9/00114 382/125 |

OTHER PUBLICATIONS

Derakhshani R; Schuckers SAC; Hornak LA; O'Gorman L, "Determination of vitality from a non-invasive biomedical measurement for use in fingerprint scanners", Pattern Recognition, Feb. 1, 2003, Elsevier, GB.

International Search Report and Written Opinion for International Application No. PCT/SE2016/050644 mailed Sep. 28, 2016, 15 pages.

Qinghan Xiao, "Security issues in biometric authentication", Systems, Man and Cybernetics (SMC) Information Assurance Workshop, 200 5. Proceedings from the Sixth Annual IEEE West Point, NY, USA Jun. 15-17, 2005, Jun. 15, 2005; Jun. 15, 2005-Jun. 17, 2005, Piscataway, NJ, USA, IEEE, ISBN 978-0-7803-9290-8 ; ISBN 0-7803-9290-6.

Rogmann Nils; Krieg Maximilian, "Liveness Detection in Biometrics", 2015 International Conference of the Biometrics Special Interest Group (BIOSIG), Sep. 9, 2015, Gesellschaft fuer Informatik.

Alahi, A. et al., "FREAK: Fast Retina Keypoint", 2012 IEEE Conference on Computer Vision and Pattern Recognition, Jun. 2012 (8 pages).

Bay, H. et al., "SURF: Speeded Up Robust Features", in: European Conference on Computer Vision, 2006 (14 pages).

Leutenegger, S. et al., "BRISK: Binary Robust Invariant Scalable Keypoints", 2011 International Conference on Computer Vision, Nov. 2011 (8 pages).

Lowe, D., "Distinctive Image Features From Scale-Invariant Keypoints", Accepted for publication in the International Journal of Computer Vision, Jan. 5, 2004 (28 pages).

Marasco, E. et al., "Combining Match Scores with Liveness Values in a Fingerprint Verification System", Proc. of 5th IEEE International Conference on Biometrics: Theory Applications and Systems (BTAS), (Washington, DC, USA), Sep. 2012 (8 pages).

Rosten, E. et al., "Machine Learning for High-Speed Corner Detection", in 9th European Conference on Computer Vision, vol. 1, pp. 430-443, 2006 (14 pages).

Rublee, E. et al., "ORB: An Efficient Alternative to SIFT or SURF", 2011 International Conference on Computer Vision, Nov. 2011 (8 pages).

* cited by examiner

APPARATUS AND COMPUTER-IMPLEMENTED METHOD FOR FINGERPRINT BASED AUTHENTICATION

CROSS REFERENCE TO RELATED APPLICATIONS

This application claims the benefit of Swedish Patent Application No. 1550972-2 filed Jul. 3, 2015. The disclosure of the above application is incorporated herein by reference in its entirety.

BACKGROUND

Authentication of an individual from a fingerprint is the process of comparing at least two instances of fingerprints (skin impressions) acquired by a fingerprint sensor to determine whether these impressions are likely to come from the same individual. Conventionally, fingerprints or a collection of fingerprint images are acquired from the same finger of the same individual during a so-called enrol process. This collection of fingerprint images is also denoted enrolled fingerprint images. The fingerprint images may be stored as images or typically as templates. A template is the container with the features extracted from the image(s) stored on a storage medium such as a hard-disk or solid-state drive.

Then, later on, when the individual wants to be authenticated, a fingerprint image is acquired and that fingerprint image, in the below also denoted a present image or verification image, is compared by advanced image processing to one or more of the enrolled images.

Due to the flexibility of the skin, no two fingerprints are ever exactly alike in every detail; even two impressions recorded immediately after each other from the same finger may be slightly different.

Authentication may comprise multiple steps; and the process thereof of deciding whether a fingerprint comes from the same individual is denoted verification. Another step of authentication is to decide whether a fingerprint image acquired by the fingerprint sensor comes from a live finger of a live individual or, alternatively, comes from an imitated or spoof finger or portion thereof in an attempt to gain unauthorized access. This step is sometimes referred to as liveness or liveness detection—the problem of finding a good method for deciding whether a fingerprint is live or spoof is also referred to as the liveness problem.

The terms imitated, spoof and fake are used interchangeably in the below. In any case an imitated or spoof finger refers to some means of leaving an imprint on the fingerprint sensor which may appear as a fingerprint, but however not being an imprint coming from a live finger touching the sensor.

In the below the term fingerprint should be construed as comprising a print from skin forming ridges and valleys such as from a human hand or a portion thereof e.g. the palm or from toes or sole of a human foot.

Conventionally, the liveness determination is performed prior to the verification process. Hence, only fingerprints deemed "live" are verified. In some cases a fingerprint is wrongly deemed "spoof" and thus not processed further. Accordingly, a non-robust liveness determination process will significantly degrade the overall quality of an authentication process based on fingerprints.

Structurally, a component for determining liveness is clearly separated from a verification component. That is, both of the components base their results on separate processing paths for the processing of the fingerprint image acquired by the fingerprint sensor.

In the article "Combining Match Scores with Liveness Values in a Fingerprint Verification System" by Marasco et al. it is investigated if combining liveness values with match scores can improve the verification performance in addition to improving the robustness to spoof attacks.

US 2007/0014443 (Atrua Technologies, Inc.) discloses a method for reducing the chances that real fingers will be falsely labelled as spoof. This is achieved by comparing data captured during verification to adjust the probability of a spoof. In an embodiment, the spoof detection is performed after fingerprint verification. Such an embodiment is said to be most useful during identification to avoid a time consuming database search.

EP2101282B1 (Fujitsu Ltd.) discloses a method wherein a matching determination threshold is set on the basis of the forgery similarity and the forgery difficulty together with the forgery determination threshold. Through the process, it is possible to reduce the possibility that the biologic object is erroneously determined as a spoof without increasing the risk in authentication with a fake. The matching determination threshold is a threshold used to determine whether a matching score between input matching data and registered matching data indicates sameness.

SUMMARY

In performing the verification process, data is generated that normally is discarded. However, in accordance to the invention it is suggested to "make the most" of this data and also use the data in the liveness determination. Accordingly, there is suggested to introduce a direct connection between the verification process and the liveness determination. In some embodiments, the verification process is performed prior to the liveness determination.

It is suggested to perform the fingerprint verification prior to performing the liveness determination. In addition, data resulting from the verification process is used as an input also to the liveness determination.

There is provided a computer-implemented method of processing a fingerprint image, comprising:
a) acquiring a present fingerprint image from a fingerprint sensor and computing a plurality of first feature vectors of the present fingerprint image;
b) retrieving a plurality of second feature vectors of an enrolled fingerprint image from a storage;
c) applying a similarity measure to compute a plurality of similarity values that represents a degree of similarity between a set of first feature vectors and second feature vectors;
d) performing first classification of at least a portion of the plurality of similarity values to generate a first signal indicative of whether the present fingerprint image falls within a class defined from enrolled images;
e) performing second classification of at least a portion of the plurality of similarity values to generate a second signal indicative of whether the present fingerprint image falls within a class of fingerprints from live fingers or a class of fingerprints from imitated fingers;
f) generating an authentication signal from the first signal and the second signal.

This method presents an alternative solution to the liveness problem, wherein it is determined whether matching features of the present image and an enrolled image (as opposed to features from only a present image) represents a comparison between live fingers, or between live and fake fingers. That is, it is assumed that enrolled fingers are live fingers; however conventional methods can be applied to check for that.

Experiments have shown that improved reliability in correctly authorizing or rejecting an individual based on fingerprint biometrics is thereby achieved.

It is an advantage that the similarity values, which are conventionally computed for verification only, is further applied to improve robustness of liveness detection e.g. by rejection of spoof fingerprints sensed by the fingerprint sensor when finger dummies or coatings are applied to leave a fingerprint on the fingerprint sensor in an attempt to trick an authentication process.

The second classification builds on a classification model, also denoted a classifier, that is trained by supervised learning wherein similarity values from pairs of fingerprint images are input to train the model and wherein groundtruth for training the model is given in the form of 'labels' indicating for each of the fingerprint images whether it is a spoof fingerprint or live fingerprint.

Further, it is an advantage that the computer-implemented method can take advantage of using the similarity values not only for verification, but using the similarity values which are already computed also for liveness detection. Consequently, in some embodiments authentication, comprising verification and liveness detection, can be performed while dispensing with extensive additional computation of features for liveness detection. Consequently, fewer computational resources are needed; which in turn may provide one or more of: saving electrical power, prolonging battery time, faster authentication, and freeing resources for other processes running on the computer. Especially for mobile devices such as smart phones, watches and tablets these are important advantages.

In some aspects the enrolled fingerprint image or a collection of enrolled fingerprint images is a previously enrolled fingerprint image that is associated with authentication information e.g. in the form of a user identification. Such enrol procedures are well-known to a person skilled in the art.

In some aspects the sets of first feature vectors and second feature vectors are pairs of first feature vectors and second feature vectors.

In some aspects the classifier comprises one or more classifiers which are a so-called one-class classifier or a multi-class classifier e.g. a two-class classifier.

The one or more classifiers may define a decision boundary which can be considered a multidimensional threshold or range. The decision boundary defines in case of a one-class classifier which examples that fall within a class and which examples that fall outside the class. In case of a multi-class classifier the decision boundary defines which examples that fall within which class or outside the classes. The term examples comprise similarity measure values, which may be represented as a histogram as described in more detail further below.

In supervised learning, each example is a pair comprising an input object (comprising similarity measure values) and a desired output value (also denoted a supervisory signal). A supervised learning algorithm analyses the training data and produces a decision boundary, which can be used for classifying examples by outputting a class label. An optimal scenario will allow for the algorithm to correctly determine the class labels for unseen examples. This requires the learning algorithm to generalize from the examples used during supervised training.

The decision boundaries may be estimated from training as described above. The decision boundaries are represented by parameters in a model which a classifier performing the classification uses to decide whether a feature falls within one class or another. A parameter defining a decision boundary may be an example selected from the training set, also denoted a support vector in the case when Support Vector Machines are used for machine learning as described further below.

Classifiers for supervised training may be selected as one classifier or compound classifiers from the group of: Ensembles (Bagging, Boosting, Random forest), k-NN, Linear regression, Bayes e.g. Naive Bayes, Neural networks, Logistic regression, Perceptron, Support vector machine (SVM) and Relevance vector machine (RVM).

The term 'similarity measure' is the scheme for measuring similarity. Various schemes for measuring similarity are available.

In some embodiments the storage is a so-called template storage.

In some embodiments the plurality of values of the similarity measure is computed by firstly generating a vector representation of the similarity between a first feature vector and a second feature vector; and secondly computing an aggregated similarity value across the vector representation of the similarity.

Such a process is convenient for computing similarity between a first feature vector and a second feature vector from respective first and second images.

In some aspects the vector representation of the similarity between a first feature vector and a second feature vector is a difference vector which agrees in size with the first feature vector which agrees in size with the second feature vector and which represents differences element-by-element of vectors. The aggregated similarity value may be a sum of values across the elements of the difference vector.

In some aspects the representation of each feature comprises a binary string—a sequence of ones and zeros—and a location in the image. The comparison of two features is implemented by counting the number of positions in the two binary strings that differ—this is referred to as the Hamming distance.

Especially for binary feature vectors it is convenient when the similarity measure is computed as a Hamming distance. The Hamming distance can be computed by standard operations in some programming languages. For binary feature vectors the difference vector may be computed by a logical XOR operation and the sum may be computed by a popcnt( ) function known from the programming language C.

Other binary or non-binary similarity measures may be selected as alternatives or in addition to the Hamming distance measure.

In some embodiments the method comprises: organising the plurality of the similarity values in a histogram representation; wherein one or both of the first classification and second classification is performed to classify the plurality of similarity values from the histogram representation.

The histogram representation may be in the form of a vector wherein elements of the vector hold a value that represents the count in the bins of the histogram and wherein a predefined convention defines which element of the vector that holds the count for a given bin.

An advantage of compiling the information in a histogram representation is that a fixed-length feature vector (the vector of bin values) can be obtained, which is desirable when applying a learning algorithm. The feature vector representing the histogram may comprise e.g. 64, 128, 256, 512 or any other number of elements that enables sufficient classification quality.

In some aspects the computer-implemented method comprises a step normalising the plurality of the values of the similarity measure, which is desirable when applying a learning algorithm. Normalisation may be performed such that all bin values of each histogram add up to a predefined value of e.g. 1.0.

The histogram representation may also or alternatively comprise a parametric representation of the histogram. Parameters thereof may comprise one or more of: a geometric mean of the histogram, the number of the bin holding the smallest count above a predefined threshold, and other parameters. Alternatively, the histogram representation may comprise a parametric representation of a distribution estimated from the plurality of similarity values. The representation may comprise one or more of first order moments, second order moments, third order moments and higher order moments. The distribution may be selected to be of a particular type e.g. a normal distribution, a log-normal distribution or another distribution. The type of distribution may be based on examples of pairs of fingerprint images.

The classifier configured to classify those similarity values which represent coincidence of the present fingerprint image with a group of fingerprint images from live fingers or imitated fingers is trained under supervised training with the histogram representation as an input. Also, for classification, the classifier receives the histogram representation as an input. As mentioned in more detail below, the classification may take other features into account.

In some embodiments the first feature vectors are computed from image data in regions about respective positions in the present fingerprint image; and wherein the second feature vectors are computed from image data in regions about respective positions in a previously enrolled fingerprint image.

Such features may be descriptors. The framework for computing features comprises both keypoint detectors and descriptors. Keypoint detectors are detectors configured to locate keypoints in a fingerprint image. A keypoint detector is configured to locate those points that are statistically likely to be located again in a similar image. A keypoint detector is configured to locate image elements such as corners or other high-contrast points/regions.

Descriptors on the other hand comprise a local representation of the region or neighbourhood about the keypoint and are configured to capture the image content in that neighbourhood in a compact representation that can be efficiently searched and compared to descriptors computed from other fingerprint images.

In some embodiments a keypoint detector comprises an algorithm denoted FAST and a descriptor comprises the oriented BRIEF descriptor. When applied in combination they are collectively referred to as ORB or the ORB framework devised by Ethan Rublee, Vincent Rabaud, Kurt Konolige, Gary R. Bradski in: "ORB: An efficient alternative to SIFT or SURF", ICCV 2011: 2564-2571. The FAST algorithm was devised by E. Rosten in: "Machine Learning for High-speed Corner Detection", 2006.

In some embodiments other keypoint detectors and/or descriptors are used; as an alternative keypoint detector a Harris corner detector may be used.

In some embodiments other frameworks is/are used, e.g.:
a) SIFT, devised by: Lowe, D. G., "Distinctive Image Features from Scale-Invariant Keypoints", International Journal of Computer Vision, 60, 2, pp. 91-110, 2004;
b) SURF, devised by: Bay, H. and Tuytelaars, T. and Van Gool, L. "SURF: Speeded Up Robust Features", 9th European Conference on Computer Vision, 2006
c) BRISK, devised by: Stefan Leutenegger, Margarita Chli and Roland Siegwart: BRISK: Binary Robust Invariant Scalable Keypoints. ICCV 2011: 2548-2555.
d) FREAK, devised by: A. Alahi, R. Ortiz, and P. Vandergheynst. FREAK: Fast Retina Keypoint. In IEEE Conference on Computer Vision and Pattern Recognition, 2012. CVPR 2012 Open Source Award Winner.

It should be noted that other keypoint detectors and/or descriptors may be applied in addition or as alternatives.

In some embodiments the method comprises:
a) matching first feature vectors and second feature vectors to form a first set of matching pairs;
b) reducing the first set of matching pairs to a second set of matching pairs that comprises those matching pairs that agree to a uniform geometrical transformation;

wherein computation of the plurality of values of the similarity measure is restrained to be computed from the pairs of first feature vectors and second feature vectors that falls into the second set of matching pairs.

This process filters the pairs of first feature vectors and second feature vectors to matching pairs of first feature vectors and second feature vectors that can be used for reliable classification. In some embodiments the step of matching first feature vectors and second feature vectors is performed iteratively.

In some embodiments the step of reducing the first set of matching pairs to a second set of matching pairs that comprises those matching pairs that agree to a uniform transformation is performed by a RANSAC algorithm.

In some embodiments, the step of matching first feature vectors and second feature vectors to form a first set of matching pairs is performed by for every feature, a, located in the present fingerprint image, A, searching for a corresponding feature, b, in an enrolled fingerprint image, B, by comparing the feature, a, with all features in the enrolled fingerprint image, B, and selecting the one that is most similar in the sense that the feature, and b, has the lowest Hamming distance. That gives one candidate pair of features in the enrolled fingerprint image, B, for every feature in present fingerprint image, A. In some embodiments, a corresponding feature, b, in an enrolled fingerprint image comprises a list of corresponding features. The list of features may be collected to comprise a predefined number of features that have the lowest Hamming distance or features that have a Hamming distance lower than a predefined threshold.

When a corresponding feature, b, in an enrolled fingerprint image comprises a list of corresponding features, the step of reducing the first set of matching pairs to a second set of matching pairs may be performed iteratively to select that combination of features from the lists that most closely agrees to a uniform transformation.

In some embodiments the first feature vectors and the second feature vectors that fall outside one or both of the first set of matching pairs and the second set of matching pairs are collected in a first set of outlier features; and wherein one or both of the first classification and the second classification includes all or at least a portion of the outlier features in generating the first signal and the second signal, respectively.

It has been realised that outliers convey information that can improve the quality of the classification. Outliers may represent artefacts in the fingerprint image, which artefacts are not present in live fingerprint images. Examples of artefacts that may cause outliers are air bubbles below the surface of the spoof fingerprint. Other examples include deformations and structures created when creating the fingerprint cast from a mould, or when lifting a latent fingerprint or imitated finger from a surface of the fingerprint sensor.

In some embodiments one or both of the first classification and second classification is performed to classify those similarity values which represent coincidence of the present fingerprint image with a group of enrolled images from a compound feature vector that comprises similarity values arranged in a histogram representation and additionally one or more features selected from the group of:
  a) a count of matching pairs in the second set of matching pairs;
  b) a sum of matching pairs in the second set of matching pairs,
  c) a sum of similarity values, such as a sum of Hamming distances;
  d) a sum of similarity values in the second set of matching pairs;
  e) the mean of similarity values, such as the mean of Hamming distances;
  f) the mean of similarity values in the second set of matching pairs, such as the mean of Hamming distances;
  g) the standard deviation of similarity values, such as the standard deviation of Hamming distances;
  h) the standard deviation of similarity values in the second set of matching pairs, such as the standard deviation of Hamming distances;
  i) a ratio of the number of pairs in the second set of matching pairs to the number of pairs in the first set of matching pairs.

Consequently, a compound feature vector is formed which can be configured to improve reliability of the classification. It should be noted that in some embodiments other types of statistics e.g. higher order statistical moments are applied as an alternative to one or more of the above. The second set of matching pairs is also denoted the set of inliers or the pairs therein are denoted inliers.

In some embodiments one or both of the class of fingerprints from live fingers and the class of fingerprints from imitated fingers is/are defined from a collection of fingerprints from live fingers and a collection of fingerprints from imitated fingers.

In some embodiments the second classification classifies values of the similarity measure from supervised training; comprising the steps of:
  a) acquiring multiple sets of fingerprint images from multiple live individuals, and generating pairs of images thereof that matches; wherein for each pair of fingerprint images, first features vectors are computed from a first fingerprint image and second features vectors are computed from the second fingerprint images;
  b) for each pair of fingerprint images, computing a plurality of values of the similarity measure that measures the similarity between the images in the pair of fingerprint images;
    wherein step a) is performed on fingerprint images acquired from live fingers, and wherein in step b) the plurality of values of the similarity measure are collectively labelled by a first label; and
    wherein step a) is performed on fingerprint images acquired from imitated fingers, and wherein in step b) the plurality of values of the similarity measure are collectively labelled by a second label; and
    wherein a classifier is trained from one or both of a first training set comprising the plurality of values of the similarity measure obtained from live fingers with the first label as a supervisory signal and a second training set comprising the plurality of values of the similarity measure obtained from imitated fingers with the second label as a supervisory signal.

Thereby multiple sets of fingerprint images from fingers of multiple live individuals and fingerprint images from imitated fingers are acquired and conventional similarity measures can be input to the classifier that then is adapted to reliably distinguish live fingerprint images from spoof ones.

The above steps of performing supervised learning are expediently performed in a product development setting to derive a configuration of the classifier. The configuration of the classifier is then installed e.g. by downloading in products wherein the above method is applied to perform fingerprint based authentication.

In some embodiments the plurality of values of the similarity measure in the training sets are organised in histogram representations; and wherein one or both of the first classification and second classification is performed to classify the plurality of similarity values from the histogram representation.

There is also provided a computer-implemented method of configuring a first classifier by supervised training to distinguish live fingerprint images from imitated fingerprint images; comprising the steps of:
  a) acquiring multiple sets of fingerprint images, and generating pairs of images thereof that matches; wherein for each pair of fingerprint images, first features vectors are computed from a first fingerprint image and second features vectors are computed from the second fingerprint images;
  b) for each pair of fingerprint images, computing a plurality of values of the similarity measure that measures the similarity between the images in the pair of fingerprint images;
    wherein step a) is performed on fingerprint images acquired from live fingers, and wherein in step b) the plurality of values of the similarity measure are collectively labelled by a first label; and
    wherein step a) is performed on fingerprint images acquired from imitated fingers, and wherein in step b) the plurality of values of the similarity measure are collectively labelled by a second label; and
    wherein the first classifier is trained from one or both of a first training set comprising the plurality of values of the similarity measure obtained from live fingers with the first label as a supervisory signal and a second training set comprising the plurality of values of the similarity measure obtained from imitated fingers with the second label as a supervisory signal;
  c) storing a computer-readable representation of the classifier.

There is also provided a computer-readable medium carrying a program configured to perform the computer-implemented method as claimed in any of the preceding claims when run on a computer.

There is also provided an apparatus with a processing unit coupled to a fingerprint sensor, comprising:
   a) a fingerprint acquisition unit configured to acquire a present fingerprint image from a fingerprint sensor;
   b) a storage configured to store a plurality of second feature vectors of an enrolled fingerprint image;
   c) a processing unit configure to:
      (a) compute a plurality of first features vectors of the present fingerprint image;
      (b) apply a similarity measure to compute a plurality of similarity values that represents a degree of similarity between a set of first feature vectors and second feature vectors;
      (c) perform first classification of at least a portion of the plurality of similarity values to generate a first signal indicative of whether the present fingerprint image falls within a class defined from enrolled images;
      (d) perform second classification of at least a portion of the plurality of similarity values to generate a second signal indicative of whether the present fingerprint image falls within a class of fingerprints from live fingers or a class of fingerprints from imitated fingers; and
      (e) generate an authentication signal from the first signal and the second signal.

In some embodiments the apparatus comprises a first memory area storing a first model supporting the first classification and a second memory area storing a second model supporting the second classification; wherein the first model is accessible for the computing unit to configure the first model with information obtained from enrolled images; wherein the second model is installed via a download signal received by the apparatus and then installed for read-only operations.

In some embodiments the apparatus is one of a mobile phone, a smart phone, a tablet computer, a laptop computer and a general purpose computer.

Here and in the following, the terms 'processing means' and 'processing unit' are intended to comprise any circuit and/or device suitably adapted to perform the functions described herein. In particular, the above term comprises general purpose or proprietary programmable microprocessors, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof.

In general a computer program configured to perform the computer-implemented method shall mean any program configured to perform the computer-implemented method such as combinations of programs.

A computer-readable medium carrying a program configured to perform the computer-implemented method shall mean any medium such as a memory device or storage device.

BRIEF DESCRIPTION OF THE DRAWINGS

A more detailed description follows below with reference to the drawing, in which.

DETAILED DESCRIPTION OF EXAMPLE EMBODIMENTS

Figure 1:
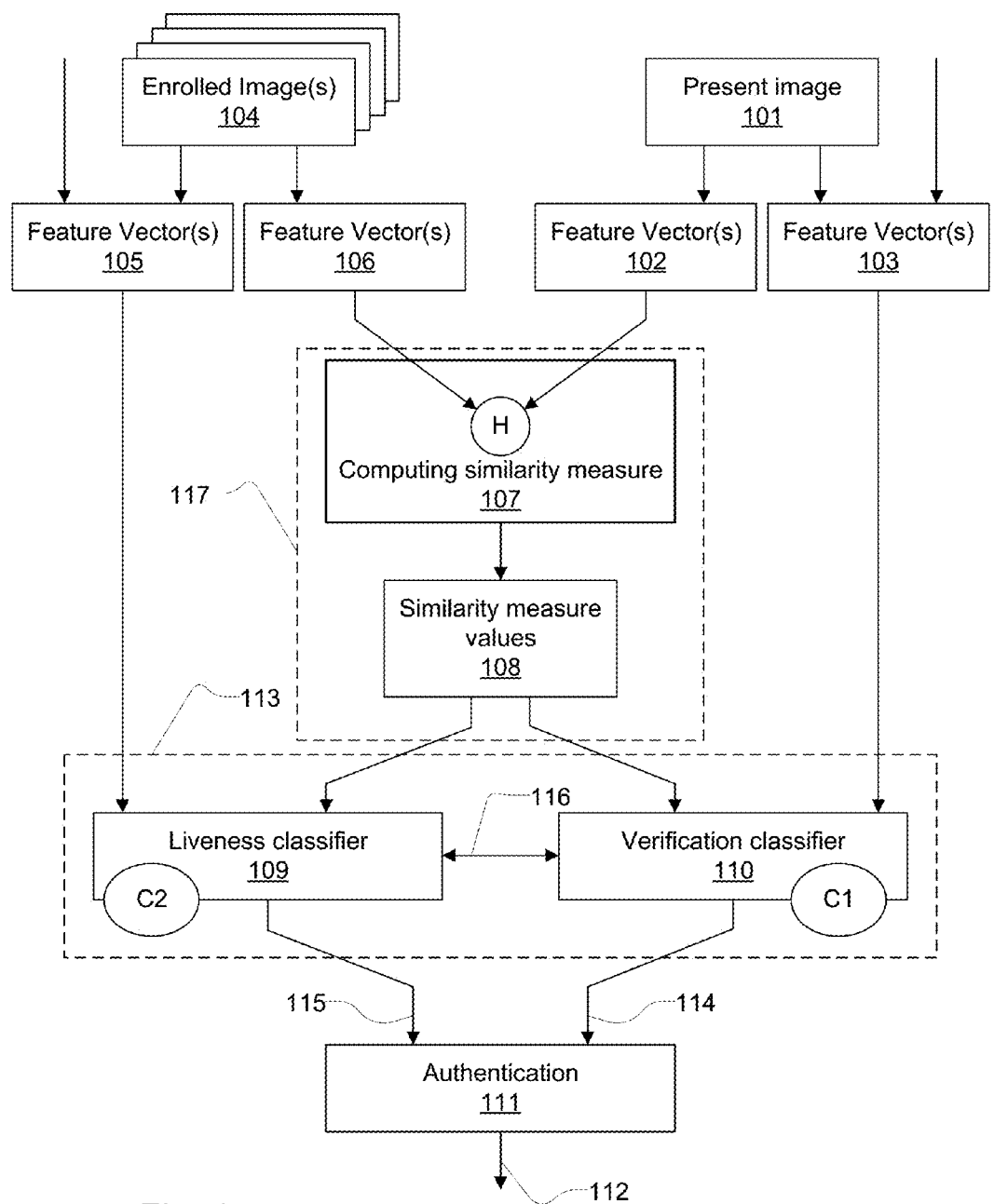
FIG. 1 shows a first flowchart of the computer-implemented method.

FIG. 1 shows a first flowchart of the computer-implemented method. A present image 101, also denoted a verify image, is acquired from a fingerprint sensor and feature vectors 102 are computed from the present image. Optionally, feature vectors 103 may be computed. The feature vectors may comprise one or more of binary feature vectors and real-value and integer value feature vectors as mentioned above. A present image is acquired when an individual is requesting authentication. A request for authentication may be detected by the fingerprint sensor as it is known in the art and/or be other sensors such as proximity sensors and movement sensors.

During an enrolment procedure known in the art, multiple different fingerprint images also denoted enrolled images 104 are acquired from the individual and feature vectors 106 are computed therefrom and optionally, feature vectors 105 may be computed as mentioned in connection with the present image 101.

The feature vectors 102 and 106 are matched one-to-one in pairs and as described above; and in some embodiments as a result of a matching process and a process of identifying inliers. The process of finding matching features may also be based on Hamming distances, to find the most similar feature for each feature in the present image.

The feature vectors 102 and 106 are then processed by step 107 wherein the Hamming distance of each pair of matching features is computed. Thus, in this embodiment the similarity measure is the Hamming distance. The result thereof is a collection of similarity measure values 108 in the form of Hamming distances; one value for each pair of matching features.

The similarity measure values 108 are then input to a verification classifier 110 which is configured to classify at least a portion of the plurality of similarity values 108 to generate a first signal 114; 116 indicative of whether the present fingerprint image 101 falls within a class defined from enrolled images; that is, whether it can be statistically verified that the present image is taken from the same individual as the one from whom the enrolled images were taken. Thus, the verification classifier 110 performs verification classification and the result thereof is represented in the first signal 114; 116, which may be a binary signal indicating either that the present image is verified/accepted or rejected. The first signal may alternatively or additionally indicate the likelihood thereof.

In case the verification classifier 110 verified that the present image is taken from the same individual as the one from whom the enrolled images were taken, a liveness classifier 109 is applied to the same similarity measure values 108 to generate a second signal 115; 116 indicative of whether the present fingerprint image 101 falls within a class of fingerprints from live fingers or a class of fingerprints from imitated fingers. Thus, the liveness classifier 109 performs liveness classification and the result thereof is represented in the second signal 115; 116, which may be a binary signal indicating either that the present image is from a live finger or from an imitated finger. The second signal 115; 116 may alternatively or additionally indicate the likelihood thereof.

An authentication unit 111 receives one or more of the first signal 114 and the second signal 115 and therefrom generates an authentication signal 112. The authentication signal 112 is thereby indicative of whether the present image should result in authentication or not based on verification classification and liveness classification. The authentication signal 112 may be delivered to an operating system for taking subsequent action on the authentication signal as it is known in the art.

In some embodiments the verification classifier 110 and the liveness classifier 109 are arranged in a series configuration via signal 116 in its right-pointing direction, where verification is performed before liveness detection. In such embodiments the signal 115 may convey sufficient information for deciding on authentication and the signal 114 can be dispensed with.

In other embodiments liveness classification 109 is performed before verification classification 110 via signal 116 in its left-pointing direction.

In still other embodiments, liveness classification 109 and verification classification 110 are performed in parallel or concurrently.

As mentioned above, the verification classifier may be a so-called one-class classifier classifying enrolled images in a class C1, which encloses features of enrolled images in a generalised manner, but statistically excludes features computed from fingerprints from other individuals. As for the liveness classifier, the verification classifier will relate features from a present image to features from one or more enrolled images. And a one-class classifier would discriminate between feature matches from image pairs of the same individual and everything else.

Also, as mentioned above, the classifier may be a multi-class classifier, which may enclose features from fingerprint images from other individuals in a positively defined class. Additionally or alternatively the classifier may have one or more additional classes to enclose features from fingerprint images from other enrolled individuals in a class of its own, in which case multiple users can be individually authenticated.

Also as mentioned above, the liveness classifier may be a so-called one-class classifier classifying images from live fingers in a class C2, which encloses features of live images in a generalised manner. Computationally, matches (feature similarities) are classified; which effectively yields a classification of the present image or authentication attempt.

Alternatively, the classifier may classify images from imitated fingers in the class C2. Also, as mentioned above, the classifier may be a multi-class classifier wherein e.g. features from live fingers are classified in a first class and features from spoof images are classified in a second class.

In some embodiments step 107 and the resulting values 108, enclosed in box 117, are performed as described above to generate one set of similarity values 108 per acquired verification image 101. This set of similarity values 108 is then used for both of verification and liveness detection.

In other embodiments, an additional feature processing path is performed in parallel with 117 to generate a first set of similarity values optimised for verification and another set of similarity values optimised for liveness detection. That may come at the cost of additional computing operations, but may improve reliability and robustness of the overall method.

In some embodiments one or both of the set of feature vectors 103 and 105 are generated additionally from one or more other signals such as signals from a bezel of a fingerprint sensor or a signal from a proximity sensor.

In some embodiments the verification classifier 110 and the liveness classifier 109 receive feature vectors 105 and/or 103 directly, which are feature vectors carrying information in addition to the similarity values and thus having the potential to improve classification.

Figure 2:
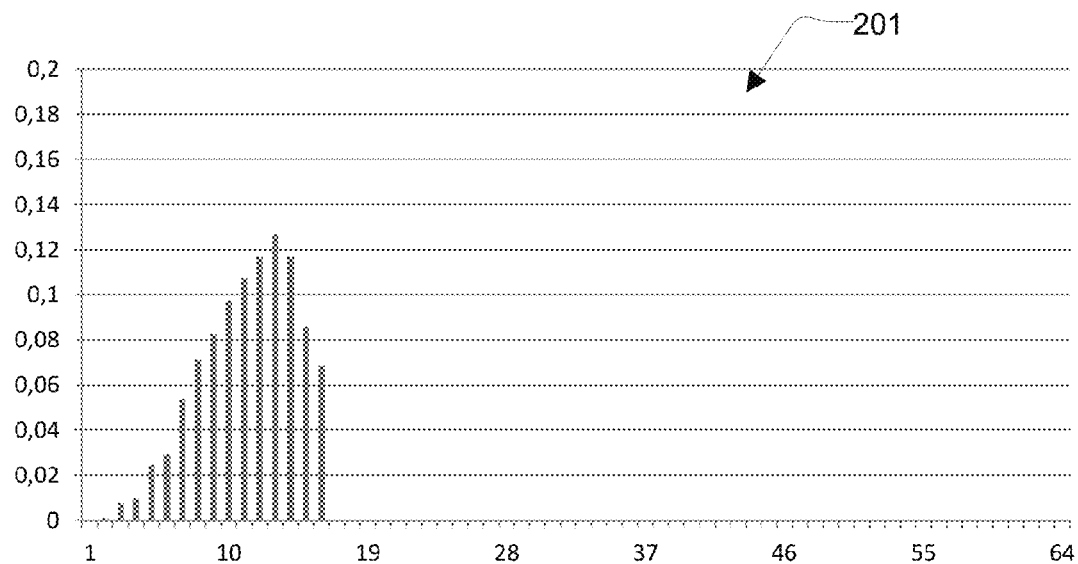
FIG. 2 shows a plot of a histogram representation of similarity values computed from live images and a plot of a histogram representation of similarity values computed from spoof fingerprint images.
Figure 2:
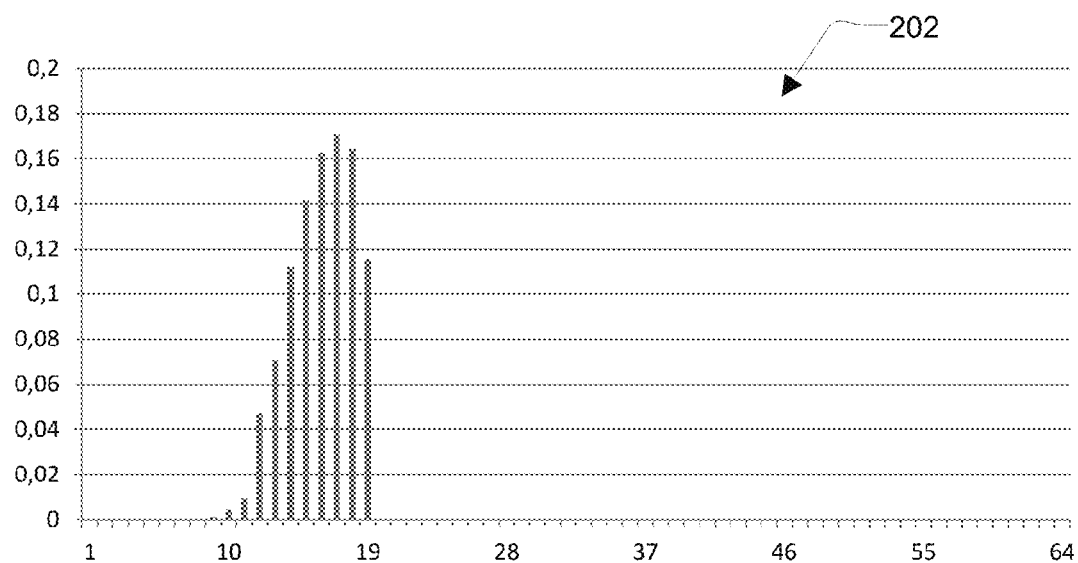

FIG. 2a shows a plot of a histogram representation of similarity values computed from live fingerprint images and a plot of a histogram representation of similarity values computed from spoof fingerprint images. The plot 201 shows a graphical presentation of the histogram representation of similarity values computed as Hamming distances between matching features of live fingerprint images i.e. live-to-live matches.

The plot 202 shows a graphical presentation of the histogram representation of similarity values computed as Hamming distances between matching features of live fingerprint images.

In this exemplified illustration the Hamming distances between the features are distributed into 64 bins. In case of a 64 bit binary feature vector, a bin corresponds to a respective Hamming distance. In case of a longer feature vector e.g. of 256 bits, the histogram representation may correspondingly be configured with 256 bins or fewer bins e.g. 64 bins. In the latter case each bin will cover a range of Hamming distances e.g. a range of 4 Hamming distances.

The histogram representations are typically normalised in the sense that the sum of values across the bins of each histogram adds up to 1.0.

As can be observed, the plot 202 comprises a distribution of values that, when compared to the values in plot 201, are shifted towards larger Hamming distances. It is also observed that the shape of the distribution is somewhat changed. It has been realised that this information is very useful for distinguishing similarity values that are computed from live-to-live images from similarity values that are computed from live-to-spoof matches. Thus, by appropriate classification, it can be decided with fairly good accuracy whether a fingerprint image is from a live finger or from an imitated finger.

Figure 3:
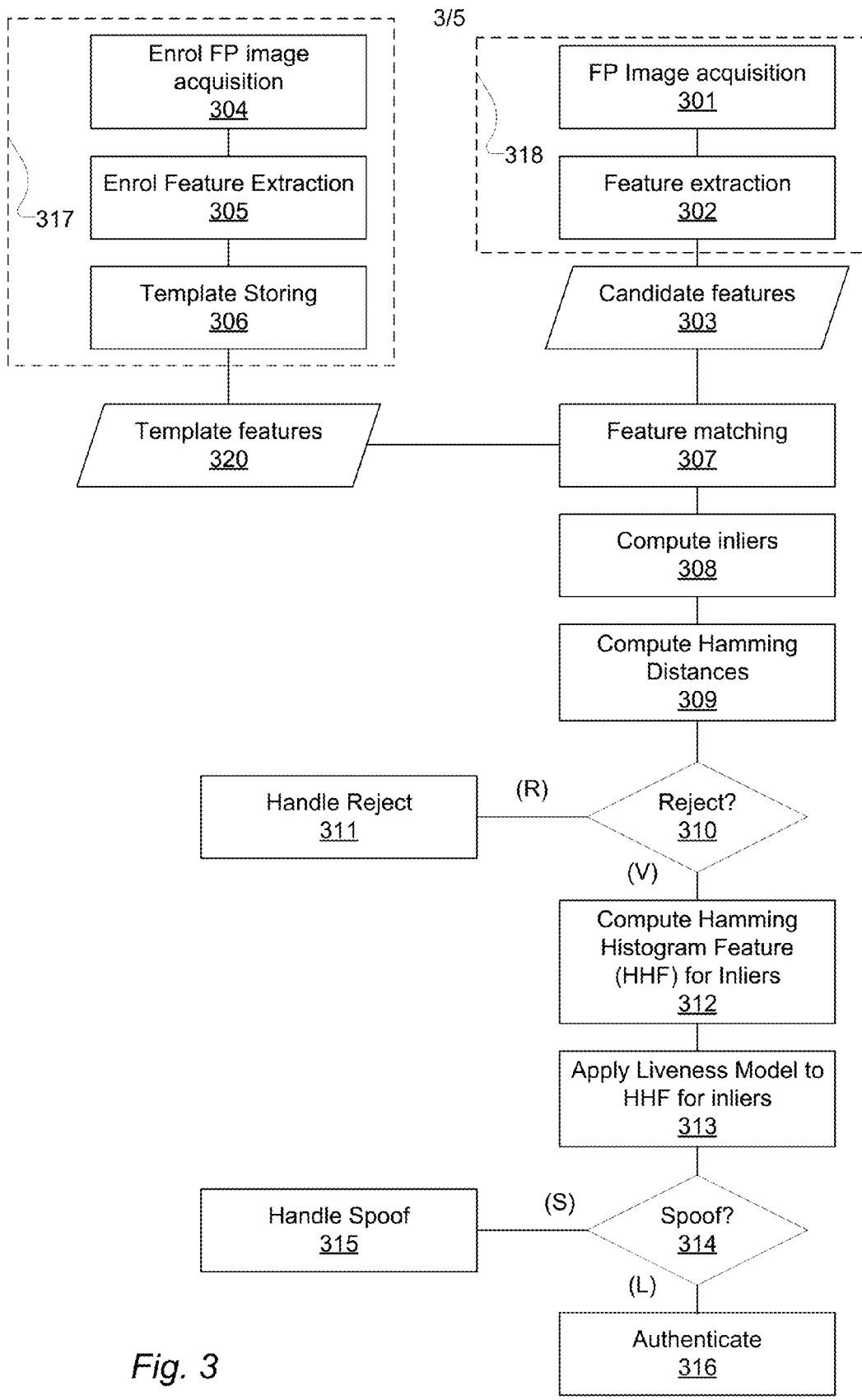
FIG. 3 shows a second flowchart of the computer-implemented method.

FIG. 3 shows a second flowchart of the computer-implemented method. The steps enclosed by box 317 are performed during an enrol procedure as described above, wherein step 304 is performed to acquire fingerprint images from the fingerprint sensor, and wherein step 305 is performed to extract or compute features from all or a subset of the fingerprint images acquired during the enrol procedure, and wherein step 306 is performed to store the computed features in a memory or storage, also denoted a template storage 320.

The steps enclosed by box 318 are performed during a verification procedure as described above, wherein step 301 acquires a verification image, and wherein step 302 computes or extracts candidate features 303 from the verification image.

Further, in connection with the verification procedure, the following steps are performed:

Step 307 performs matching of features from the candidate features 303 with features from the template features 320 as described above. Then step 308 identifies those matching features that are inliers and among the inliers Hamming distances are computed in step 309.

Step 310 applies a verification classifier and generates a decision to either reject (R) the verification image or verify or accept (V) the verification image (successful verification). In case of a rejection, step 311 handles the rejection e.g. by restricting the individual from certain further actions e.g. via an operating system and/or giving the individual a further option to authenticate himself.

In case of a successful verification (V) a feature vector comprising a histogram representation of the computed Hamming distances for inliers is computed in step 312. Subsequently, in step 313, a liveness model is applied to the feature vector comprising a histogram representation of the computed Hamming distances to classify the verification image, based on the Hamming distances, as likely belonging to a class of spoof fingerprint images or likely belonging to a class of fingerprint images from live fingers.

Based on the outcome of the classification performed in step 313, step 314 generates a decision on whether the verification image is a spoof image (S) or a live image (L). In case of a spoof image (S), step 315 handles the situation e.g. by restricting the individual from certain further actions e.g. via an operating system and/or giving the individual a further option to authenticate himself.

In case of a live image (L), step 316 authenticates the individual which in all likelihood is the rightful individual to be legitimately authenticated.

Figure 4:
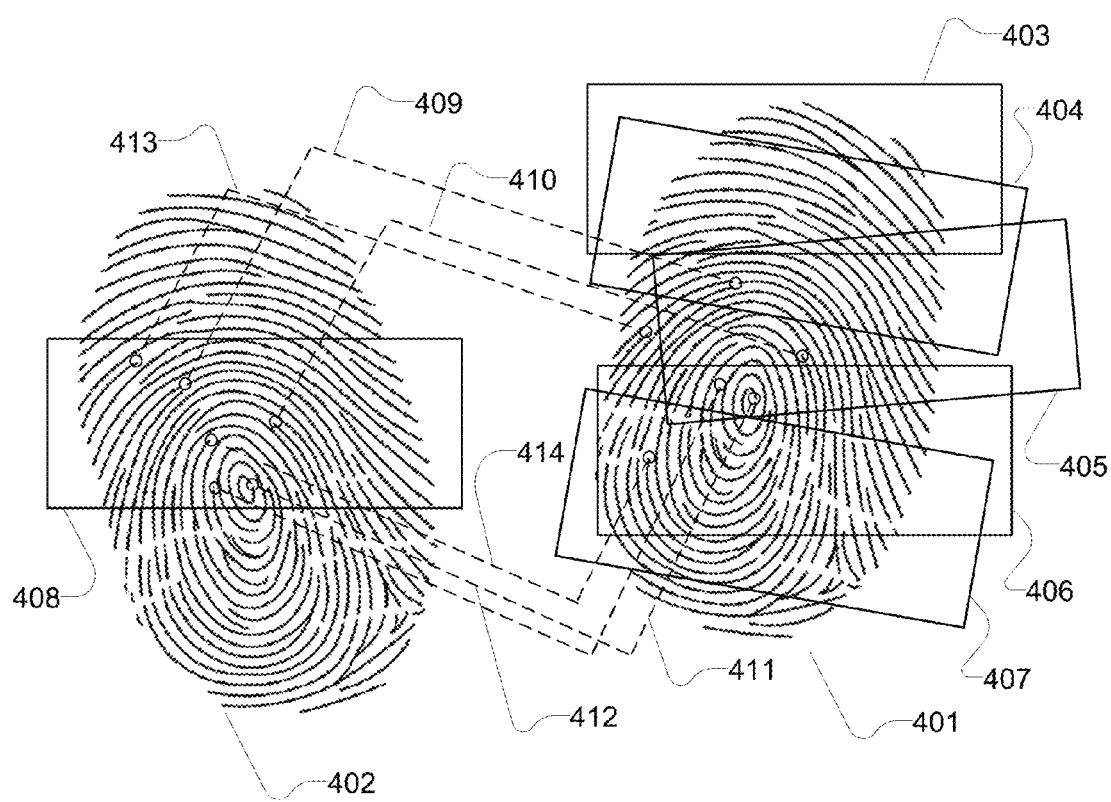
FIG. 4 illustrates location of keypoints for descriptors.

FIG. 4 illustrates location of keypoints for descriptors. In general there are shown two instances of a fingerprint where keypoints are shown by circles at the end of dashed lines that connects matching descriptor features computed at the keypoint position. The rectangular frames illustrate fingerprint images acquired from portions of a finger by a fingerprint sensor.

The rightmost fingerprint 401 is captured by five different images 403; 404; 405; 406; 407 acquired by the fingerprint sensor during an enrol process.

The leftmost fingerprint 402 is captured by a single image 408 acquired by the fingerprint sensor during a verification process; where the image 408 is also denoted a verification image.

The dashed line 409 connects a keypoint located in the verification image 408 and a matching keypoint in the enrolled image 405. The same applies for dashed lines 410, 411, and 412. From careful visual inspection it can be seen that the keypoints locate or represent the position of corresponding features. In the event that the computed feature vectors (descriptors) are matched as shown they would agree to the same transformation and thus be considered inliers. These inliers may be identified e.g. by the RANSAC algorithm.

On the contrary, dashed line 414 connects keypoints that may be matched in case the corresponding descriptors matches sufficiently well, but as can be observed by visual inspection they are not locating corresponding features. This pair of features connected by dashed line 414 would thus not agree to the transformation and would be rejected as outliers by the RANSAC algorithm.

However, dashed line 413 illustrates a keypoint found in the verification image 408, but which cannot be found in an enrolled image since no one of the enrolled images 403; 404; 405; 406; 407 covers the corresponding position in the fingerprint. Thus, the feature would—ideally—not be matched with another feature in an enrolled image.

Figure 5:
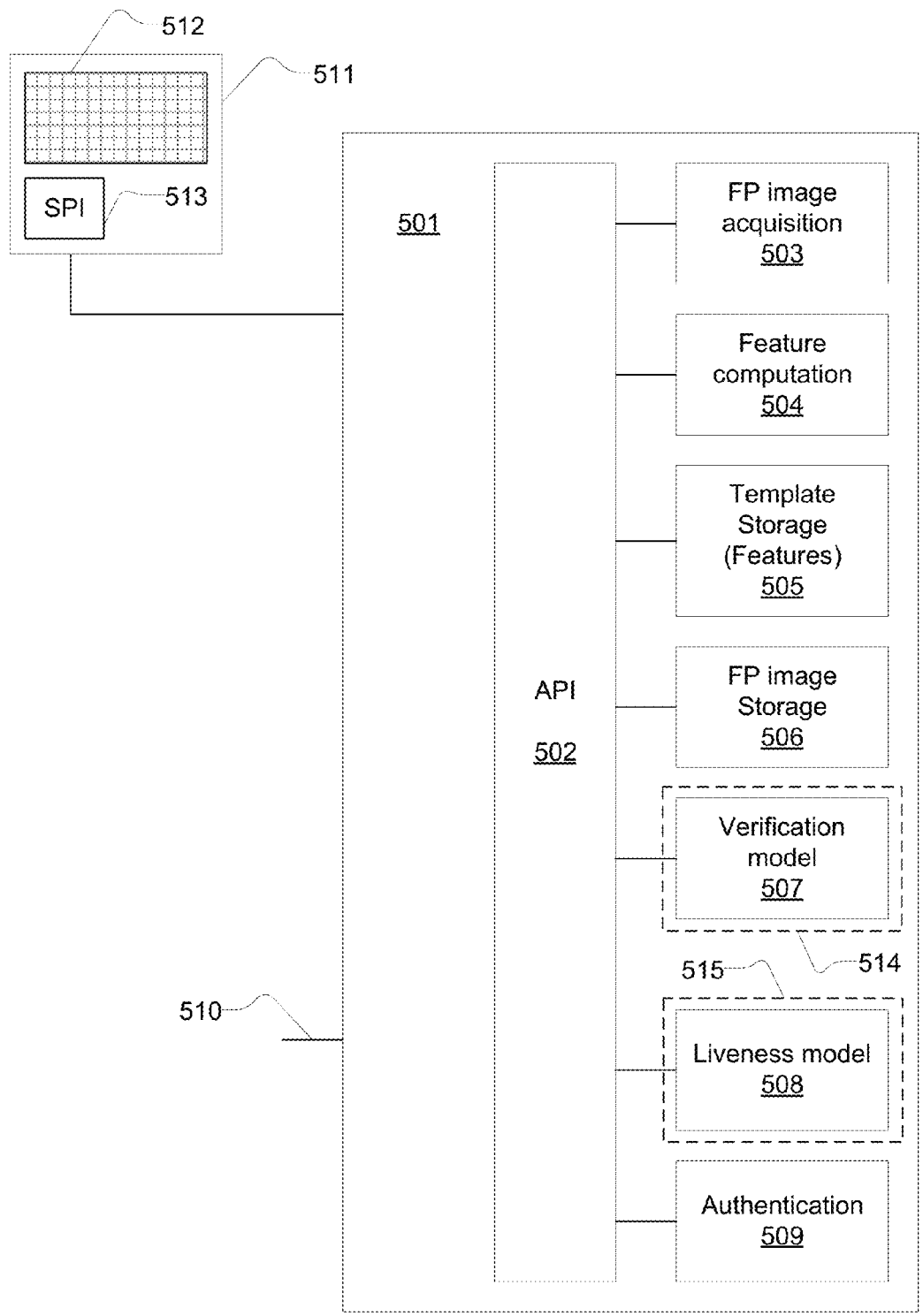
FIG. 5 shows a diagram of components for implementing the method in computing hardware.

FIG. 5 shows a diagram of components for implementing the method in computing hardware. The computing hardware comprises a processing unit 501 which may be a microprocessor dedicated to processing of fingerprint images or a central processing unit of for instance a mobile telephone which may dynamically scale its resource allocation to the method as required. The processing unit 501 is in communication with a fingerprint sensor 511, which comprises a matrix of sensing elements e.g. of the capacitive type as known in the art and a serial programmable interface, SPI 513, through which the processing unit 501 communicates with the fingerprint sensor 511 for acquiring fingerprint images sensed by the matrix sensor and for configuring the fingerprint sensor.

The processing unit 501 runs software components on its hardware resources. The software components comprise a fingerprint acquisition component 503 which is configured to acquire one or more fingerprint images from the fingerprint sensor 511 and store it or them in fingerprint image storage 506 such as in a memory area. The fingerprint image storage 506 may store fingerprint images only temporarily while they are processed during an enrol process and when a present image is processed or they may be stored for processing following thereafter.

The software components also comprise a feature computation component 504, which as mentioned in the above identifies and computes features e.g. comprising keypoints and descriptors by processing the fingerprint images which comprises enrolled fingerprint images and one or more present fingerprint images (verification images).

As a result thereof the feature computation component 504 stores features at least from enrolled fingerprint images in a so-called template storage 505, which is memory area and/or storage object configured for storing features.

The processing unit 501 comprises a first memory area 514 storing the first model 507 that supports the verification classification and a second memory area 515 storing the second model 508 that supports the liveness classification. The first model 507 is accessible for the computing unit 501 to configure the first model with information such as from features obtained from enrolled images. The second model 508 is installed via a download signal 510 received by the computing hardware during a download process where firmware is installed with the processing unit; the second model is installed for read-only operations. The firmware may comprise one, more or all of the above-mentioned components.

The invention claimed is:

1. A computer-implemented method of processing a fingerprint image, comprising:
   acquiring a present fingerprint image from a fingerprint sensor and computing a plurality of first feature vectors of the present fingerprint image;
   retrieving a plurality of second feature vectors of an enrolled fingerprint image from a storage;
   applying a similarity measure to compute a plurality of similarity values that represents a degree of similarity between a set of first feature vectors and second feature vectors;
   performing first classification of at least a portion of the plurality of similarity values to generate a first signal indicative of whether the present fingerprint image falls within a class defined from enrolled images;
   performing second classification of at least a portion of the plurality of similarity values to generate a second signal indicative of whether the present fingerprint image falls within a class of fingerprints from live fingers or a class of fingerprints from imitated fingers;
   generating an authentication signal from the first signal and the second signal;
   characterized in:
   matching first feature vectors and second feature vectors to form a first set of matching pairs;

reducing the first set of matching pairs to a second set of matching pairs that comprises those matching pairs that agree to a uniform geometrical transformation;

wherein computation of the plurality of values of the similarity measure is restrained to be computed from the pairs of first feature vectors and second feature vectors that falls into the second set of matching pairs;

wherein the first feature vectors and the second feature vectors that fall outside one or both of the first set of matching pairs and the second set of matching pairs are collected in a first set of outlier features; and wherein one or both of the first classification and the second classification includes all or at least a portion of the outlier features in generating the first signal and the second signal, respectively.

2. A computer-implemented method according to claim 1, wherein the plurality of values of the similarity measure is computed by firstly generating a vector representation of the similarity between a first feature vector and a second feature vector; and secondly computing an aggregated similarity value across the vector representation of the similarity.

3. A computer-implemented method according to claim 1, comprising:
organising the plurality of the similarity values in a histogram representation;
wherein one or both of the first classification and second classification is performed to classify the plurality of similarity values from the histogram representation.

4. A computer-implemented method according to claim 1, wherein the first feature vectors are computed from image data in regions about respective positions in the present fingerprint image; and wherein the second feature vectors are computed from image data in regions about respective positions in a previously enrolled fingerprint image.

5. A computer-implemented method according to claim 1, wherein one or both of the first classification and second classification is performed to classify those similarity values which represent coincidence of the present fingerprint image with a group of enrolled images from a compound feature vector that comprises similarity values arranged in a histogram representation and additionally one or more features selected from the group of:
a count of matching pairs in the second set of matching pairs;
a sum of matching pairs in the second set of matching pairs,
a sum of similarity values, such as a sum of Hamming distances;
a sum of similarity values in the second set of matching pairs;
the mean of similarity values, such as the mean of Hamming distances;
the mean of similarity values in the second set of matching pairs, such as the mean of Hamming distances;
the standard deviation of similarity values, such as the standard deviation of Hamming distances;
the standard deviation of similarity values in the second set of matching pairs, such as the standard deviation of Hamming distances;
a ratio of the number of pairs in the second set of matching pairs to the number of pairs in the first set of matching pairs.

6. A computer-implemented method according to claim 1, wherein one or both of the class of fingerprints from live fingers and the class of fingerprints from imitated fingers is/are defined from a collection of fingerprints from live fingers and a collection of fingerprints from imitated fingers.

7. A computer-implemented method according to claim 1, wherein the second classification classifies values of the similarity measure from supervised training; comprising the steps of:
a) acquiring multiple sets of fingerprint images from multiple live individuals, and generating pairs of images thereof that matches; wherein for each pair of fingerprint images, first feature vectors are computed from a first fingerprint image and second feature vectors are computed from a second fingerprint image;
b) for each pair of fingerprint images, computing a plurality of values of the similarity measure that measures the similarity between the images in the pair of fingerprint images;
wherein step a) is performed on fingerprint images acquired from live fingers, and wherein, in step b), the plurality of values of the similarity measure are collectively labelled by a first label; and
wherein step a) is performed on fingerprint images acquired from imitated fingers, and wherein, in step b), the plurality of values of the similarity measure are collectively labelled by a second label; and
wherein a classifier is trained from one or both of a first training set comprising the plurality of values of the similarity measure obtained from live fingers with the first label as a supervisory signal and a second training set comprising the plurality of values of the similarity measure obtained from imitated fingers with the second label as a supervisory signal.

8. A computer-implemented method according to claim 7, wherein the plurality of values of the similarity measure in the training sets are organised in histogram representations; and wherein one or both of the first classification and second classification is performed to classify the plurality of similarity values from the histogram representation.

9. A computer-implemented method of configuring a first classifier by supervised training to distinguish live fingerprint images from imitated fingerprint images; comprising the steps of:
a) acquiring multiple sets of fingerprint images, and generating pairs of images thereof that matches; wherein for each pair of fingerprint images, first feature vectors are computed from a first fingerprint image and second feature vectors are computed from a second fingerprint image;
b) for each pair of fingerprint images, computing a plurality of values of the similarity measure that measures the similarity between the images in the pair of fingerprint images;
wherein step a) is performed on fingerprint images acquired from live fingers, and wherein, in step b), the plurality of values of the similarity measure are collectively labelled by a first label; and
wherein step a) is performed on fingerprint images acquired from imitated fingers, and wherein, in step b), the plurality of values of the similarity measure are collectively labelled by a second label; and
wherein the first classifier is trained from one or both of a first training set comprising the plurality of values of the similarity measure obtained from live fingers with the first label as a supervisory signal and a second training set comprising the plurality of values of the similarity measure obtained from imitated fingers with the second label as a supervisory signal;

c) storing a computer-readable representation of the classifier.

10. A non-transitory computer-readable medium carrying a program configured to perform the computer-implemented method of claim 1 when run on a computer.

11. An apparatus with a processing unit coupled to a fingerprint sensor, comprising:
   a fingerprint acquisition unit configured to acquire a present fingerprint image from a fingerprint sensor;
   a storage configured to store a plurality of second feature vectors of an enrolled fingerprint image;
   a processing unit configured to:
      compute a plurality of first feature vectors of the present fingerprint image;
      apply a similarity measure to compute a plurality of similarity values that represents a degree of similarity between a set of first feature vectors and second feature vectors;
      perform first classification of at least a portion of the plurality of similarity values to generate a first signal indicative of whether the present fingerprint image falls within a class defined from enrolled images;
      perform second classification of at least a portion of the plurality of similarity values to generate a second signal indicative of whether the present fingerprint image falls within a class of fingerprints from live fingers or a class of fingerprints from imitated fingers; and
      generate an authentication signal from the first signal and the second signal;
      matching first feature vectors and second feature vectors to form a first set of matching pairs;
      reducing the first set of matching pairs to a second set of matching pairs that comprises those matching pairs that agree to a uniform geometrical transformation;
   wherein computation of the plurality of values of the similarity measure is restrained to be computed from the pairs of first feature vectors and second feature vectors that falls into the second set of matching pairs;
   wherein the first feature vectors and the second feature vectors that fall outside one or both of the first set of matching pairs and the second set of matching pairs are collected in a first set of outlier features; and
      wherein one or both of the first classification and the second classification includes all or at least a portion of the outlier features in generating the first signal and the second signal, respectively.

12. An apparatus according to claim 11, comprising a first memory area storing a first model supporting the first classification and a second memory area storing a second model supporting the second classification;
   wherein the first model is accessible for the computing unit to configure the first model with information obtained from enrolled images;
   wherein the second model is installed via a download signal received by the apparatus and then installed for read-only operations.

13. An apparatus according to claim 11, wherein the apparatus is one of a mobile phone, a smart phone, a tablet computer, a laptop computer and a general purpose computer.

* * * * *